United States Patent [19]
Pandohie

[11] Patent Number: 5,565,841
[45] Date of Patent: Oct. 15, 1996

[54] BRAKE LIGHT PERCEPTION ENHANCEMENT SYSTEM

[76] Inventor: Sobas R. Pandohie, 8546 Storchwood Dr. - Apt. 3A, Savage, Md. 20763

[21] Appl. No.: 352,741

[22] Filed: Dec. 2, 1994

[51] Int. Cl.$^6$ .................................................. B60Q 1/44
[52] U.S. Cl. ........................ 340/479; 340/464; 340/467; 340/468
[58] Field of Search .................................. 340/464, 468, 340/475, 479, 478, 467

[56]  References Cited

U.S. PATENT DOCUMENTS

| | | | |
|---|---|---|---|
| 4,403,210 | 9/1983 | Sullivan | 340/479 |
| 4,591,824 | 5/1986 | Lomen | 340/479 |
| 4,663,609 | 5/1987 | Rosario | 340/479 |
| 4,956,633 | 9/1990 | Waterson et al. | 340/479 |
| 4,987,405 | 1/1991 | Jakobowski | 340/479 |
| 4,990,887 | 2/1991 | Lee | 340/479 |
| 5,172,095 | 12/1992 | Scott | 340/479 |
| 5,345,218 | 9/1994 | Woods et al. | 340/479 |
| 5,376,918 | 12/1994 | Vinciguerra et al. | 340/479 |

Primary Examiner—Jeffery Hofsass
Assistant Examiner—Van T. Trieu
Attorney, Agent, or Firm—Morton J. Rosenberg; David I. Klein

[57] ABSTRACT

A system (10) for enhancing perception of the illumination of a plurality of brake lights (910, 912, 914) is provided. System (10) includes an input line (111) which is coupled to a vehicle's brake switch (908) and may have an input (142) coupled to a vehicle's turn signal switch assembly (918) for determining when the flashing of the brake lights should occur. The voltage provided from brake switch (908) is coupled through a normally closed relay contact (32) for coupling to the output (132) of system (10), such being coupled to the respective vehicle brake lights (910, 912, 914). When the brake switch is closed the brake lights are flashed at a predetermined flash rate, for a first predetermined time period, as established by a first timer circuit (58). Re-initiation of the flashing sequence is inhibited for a second time period established by second timer (56). Further, the flashing sequence may be terminated or inhibited responsive to the closure of a turn signal switch, such changing the logic state of an input (558) of the first timer (58) to thereby prevent intermittent energization of the relay (114) and the corresponding intermittent opening of the associated relay contacts (32).

20 Claims, 5 Drawing Sheets

BRAKE LIGHT PERCEPTION ENHANCEMENT SYSTEM

BACKGROUND OF THE INVENTION

1. Field of the Invention

This invention directs itself to signaling systems for motor vehicle brake systems. More particularly, this invention is directed to a system for improving and enhancing the perception of a motor vehicle's brake lights by other drivers. Further, this invention is directed to a brake light enhancement system which may be adapted to existing motor vehicle brake systems for providing an eye catching flashing of brake lights during a first predetermined time period when the brakes are first applied. Still further, this invention directs itself to a brake light perception enhancement system wherein subsequent to expiration of the first time period, any further flashing of the brake lamps which would otherwise be triggered by subsequent opening of the vehicle's brake lamp switch followed by a closing thereof, is inhibited during a second time period which follows the first time period.

2. Prior Art

Systems for enhancing the perception of vehicle signal lighting systems are known in the art. The best prior art known to Applicant include U.S. Pat. Nos. 5,172,095; 4,956,633; 4,663,609; 4,403,210; 3,914,739; 4,990,887; 5,028,908; 5,017,904; 4,990,886; 4,843,368; 5,097,251; and, 5,148,147.

In some prior art systems such as that disclosed by U.S. Pat. Nos. 4,956,633 and 4,403,210, brake light enhancement circuits are disclosed which provide for interconnection with a motor vehicle's existing brake light circuit. These systems cause the brake lights to be flashed a predetermined number of times when the brake switch is first closed, the illumination of the brake lights being maintained continuous subsequent to the predetermined number of flashes having been completed. This flashing may be terminated or inhibited when the turn signals of the vehicle are utilized, to prevent any ambiguities in the vehicle's signaling to other motorists. However, neither these systems, nor any of the known prior art provide for inhibiting re-initiation of a flashing sequence for a second predetermined time period, in order to prevent annoyance to other motorists, or undue distraction thereof. Thus, in these prior art systems the brake light flashing circuit is "reset" when the brake switch is opened, and re-started upon subsequent closure thereof. Under such circumstances, when the vehicle's brakes are applied intermittently, as when they are "tapped" or "pumped", the brake lights will flash continuously. There is therefore a need to prevent such re-initiation of the brake light flashing sequence for a predetermined time interval following the opening of the vehicle's brake switch.

SUMMARY OF THE INVENTION

A system for enhancing perception of the illumination of a plurality of brake lamps of a motor vehicle is provided. The motor vehicle includes a brake light switch for coupling the vehicle's electrical power source to the plurality of brake lamps responsive to an actuation of the vehicle's brake system. The brake light perception enhancement system includes a circuit for periodically interrupting the coupling of the electrical power source to the plurality of brake lamps for a first predetermined time period responsive to a closure of the brake light switch, to flash the plurality of brake lights at a predetermined flash rate. The interrupting circuit is electrically coupled to both the brake light switch and the plurality of brake lamps. The perception enhancement system further includes a first inhibiting circuit coupled to the interrupting circuit and the brake light switch for inhibiting the periodic interruption of the coupling of the electrical power source to the plurality of brake lamps responsive to an opening of the brake light switch followed by a subsequent closing thereof within a second predetermined time period. The second predetermined time period is of a longer duration than that of the first time period.

DESCRIPTION OF THE PREFERRED EMBODIMENT

Referring to FIGS. 1–6, there is shown brake light perception enhancement system 10 for improving the ability of drivers to perceive the illumination of a motor vehicle's brake lamps. As will be seen in following paragraphs, brake light perception enhancement system 10 is specifically directed to an add-on device for use by consumers in improving the visibility of their vehicle's brake lights. Although system 10 is configured for easy adaption to existing motor vehicles, obviously system 10 may be incorporated in newly manufactured vehicles as original equipment therefor.

In overall concept, system 10 improves the perception of brake light illumination by flashing the lamps for a predetermined time period, at a predetermined flash rate. System 10 is designed to prevent the brake lamp flashing from becoming distracting and annoying. The predetermined time period for flashing the brake lights is maintained substantially constant, irrespective of whether the driver intermittently applies the brakes during that time period or within a predetermined time thereafter. Additionally, the flashing is disabled whenever the turn signals are utilized, in vehicles which utilize the same lamps for both turn and brake signal indicators. In this manner, brake light perception enhancement system 10 improves the ability of drivers to perceive a vehicle's brake lamps, without creating confusion as to whether the brake lamps or turn signals are being activated. Still further, system 10 has been specifically designed to operate in a fail safe manner such that a failure of system 10 will not disable the brake or turn signal circuits of the motor vehicle to which it has been coupled.

Figure 5:
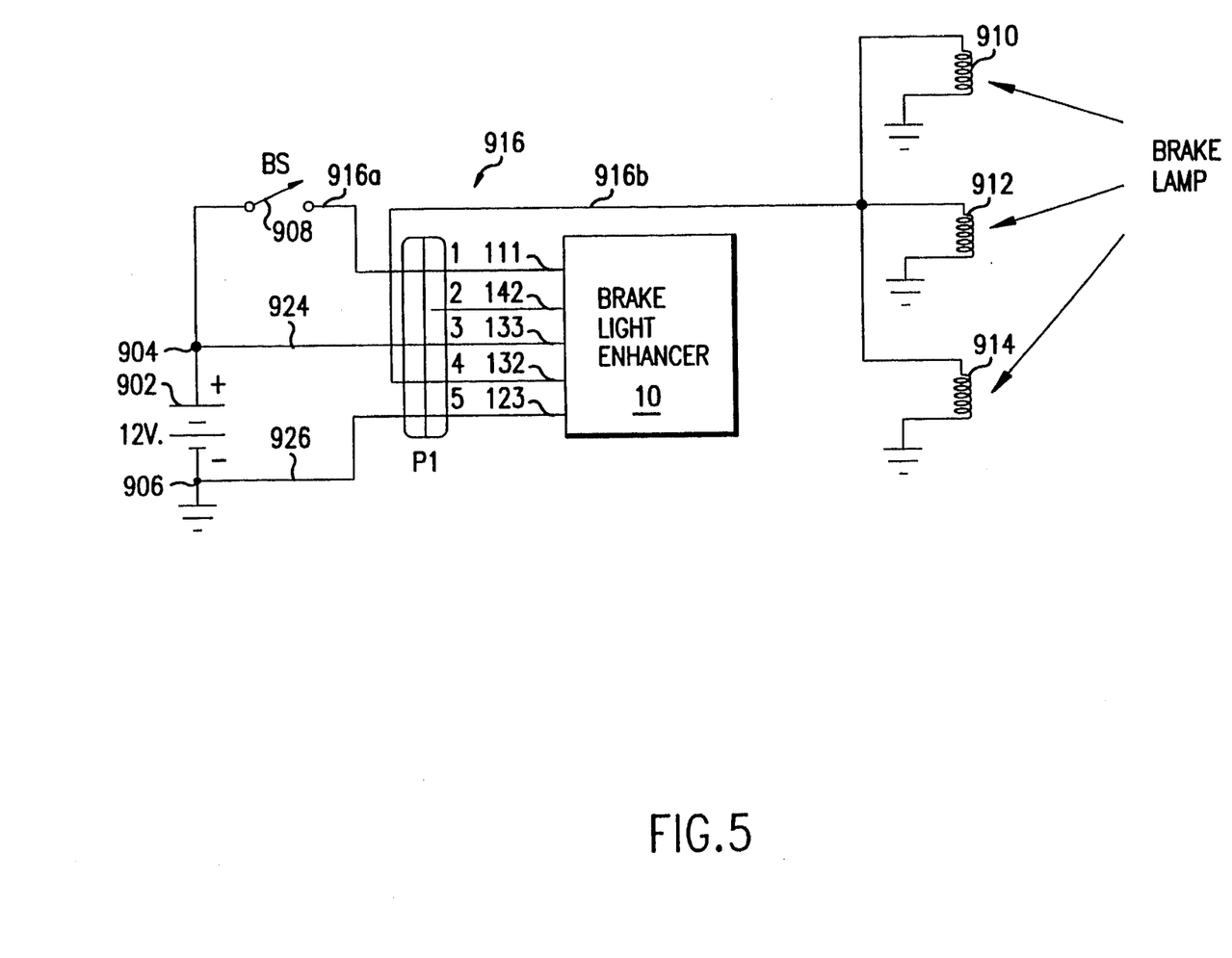
FIG. 5 is a wiring diagram showing one application of the present invention to a motor vehicle; and, FIG. 6 is a wiring diagram showing a second application of the present invention toga motor vehicle.

Turning now to, FIG. 5, there is shown, the brake light circuit of a motor vehicle to which the brake light perception enhancement system 10 has been added. Brake light perception enhancement system 10 utilizes a single connector P1 to interface with the vehicle wiring, as shown. The vehicle's 12-volt battery 902 supplies power to system 10. A lead 924 coupled between the positive battery terminal 904 and the connector P1 interfaces with system 10's 12-volt input lead 133. The negative terminal 906 of battery 902 is coupled to the system's return line 123 through connector P1 by means of the lead 926. The output line 916 of brake switch 908 is interrupted at a convenient location, with the portion 916a coming from switch 908 being coupled to the brake switch signal input line 111 through connector P1. System 10's brake lamp output line 132 is coupled to the portion 916b of the vehicle brake line 916 through connector P1 to provide the flashing and continuous brake lamp illumination of the vehicle's brake lamps 910, 912 and 914.

Figure 6:
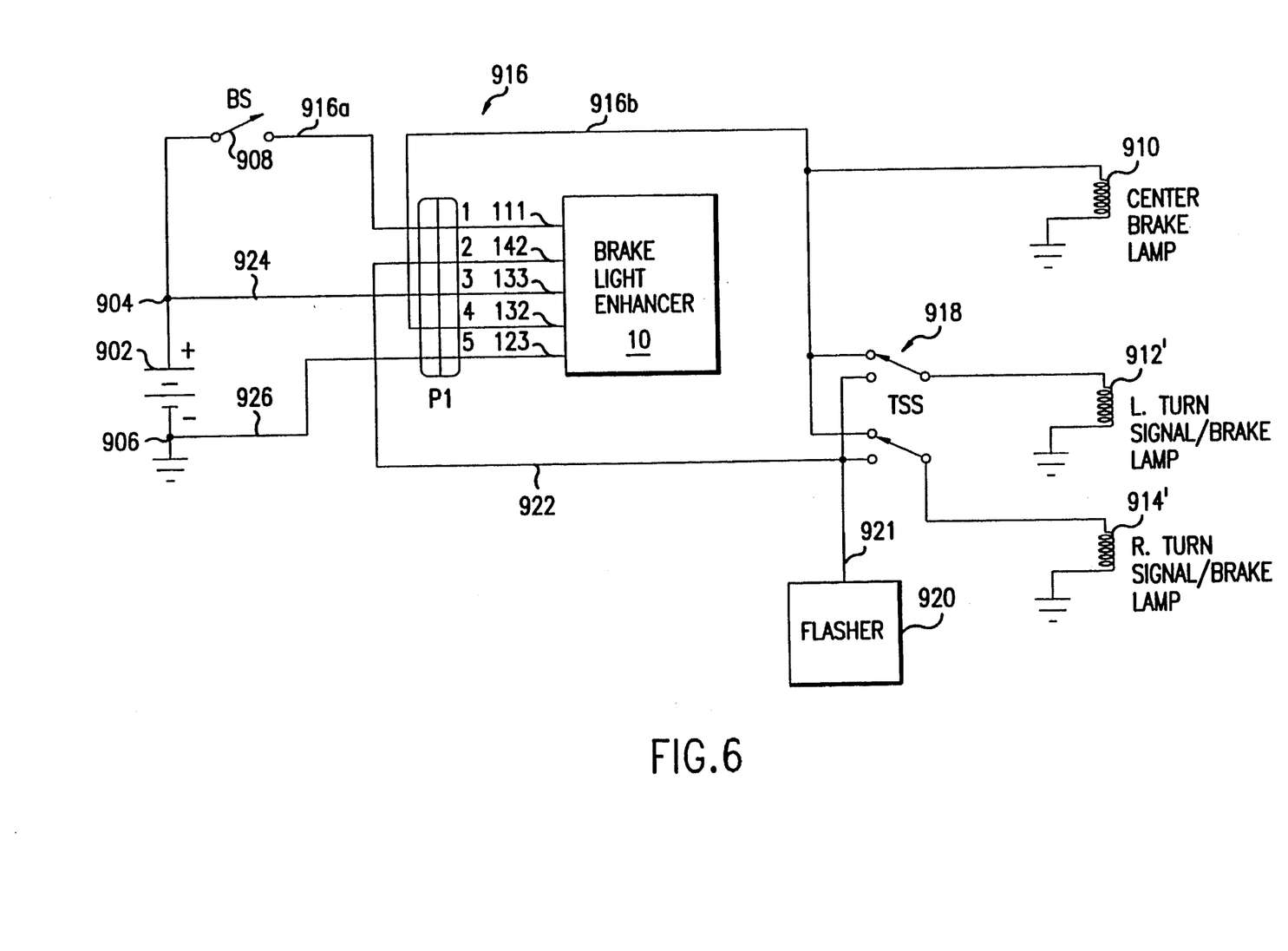

In vehicles wherein a single lamp filament is utilized for both brake and turn signal indications, the connection of system 10 follows that which is shown in FIG. 6. The configuration shown in FIG. 6 varies from that shown in FIG. 5 only in that the flasher input line 142 must be coupled to the flasher 920 by means of the connecting wire 922. Since such vehicles have turn signal switch assembly 918 which transfers the coupling of a respective turn signal lamp 912', 914' from the brake signal line 916 to the signal output from flasher 920, no wiring changes to the lamps are required.

Thus, when the turn signal switches are not operated, the center brake lamp 910, and the left and right turn signal/ brake lamps 912' and 914' are coupled to the brake lamp signal line for illumination responsive to closure of the brake switch 908 and operation of system 10 simultaneously therewith. When either the left or right turn signal switch is operated, such transfers the source for that respective lamp 912', 914' to the intermittent signal provided by the flasher 920. If during the period of time that the turn signal switch is operated the brake switch 908 is closed, the other two lamps are illuminated continuously in a conventional vehicle signaling system. In order to avoid a confusing flashing of lamps on both sides of a vehicle when turn signals are desired, system 10 disables the flashing function under these circumstances, and thereby allows for the conventional continuous illumination of the brake lamps while one of the lamps 912' or 914' is functioning as a turn signal indicator. Such inhibition of the flashing function is responsive to the detection of the intermittent flasher output as applied to the input line 142.

In order to understand the significant features of system 10, a review of the system's circuits will be beneficial. Turning now to, FIG. 2, there is shown the regulated power supply for system 10. As previously discussed, the positive terminal 904 of the vehicle's battery 902 is coupled through the input line 133 for connection to the voltage regulator integrated circuit 40 through the isolation diode 33. The 12 volts from battery 902 is coupled to the anode of diode 33 by the input line 133, the cathode of diode 33 being coupled to the input of the three terminal type regulator 40 by means of the coupled line 35. Diode 33 isolates the system 10 power supply, preventing any reverse flow of current therefrom and protecting against polarity reversals which the vehicle may be exposed to, as may inadvertently occur during servicing of the vehicle.

Figure 2:
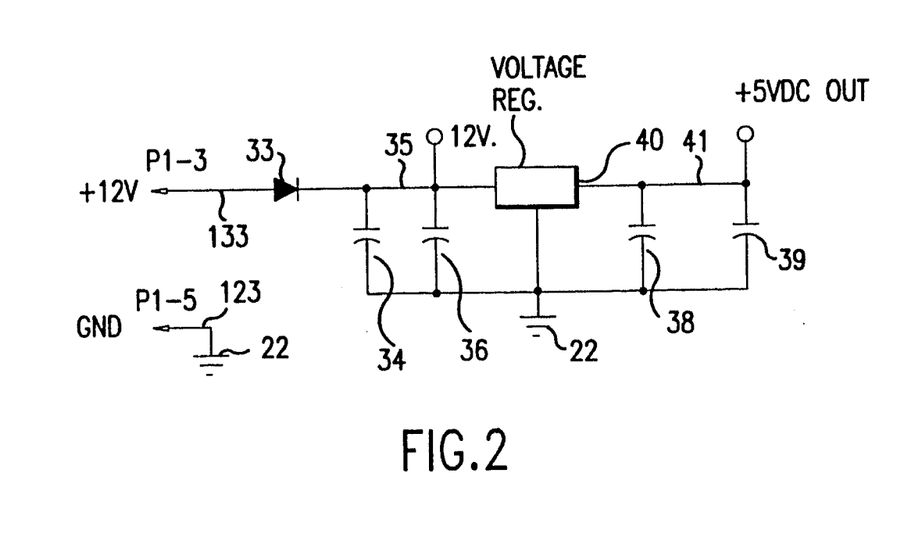
FIG. 2 is a schematic diagram of the powder supply of the present invention.

The negative terminal 906 of battery 902 is coupled to the system ground 22 through the input lead 123. The reference terminal of the voltage regulator 40 is also coupled to the ground terminal 22. Between the voltage input lead 35 and ground 22 there is provided a pair of parallel capacitors 34 and 36 to provide filtering of the input voltage. Due to the fact that vehicle electric systems are very "noisy", two capacitors are utilized in parallel, one providing a voltage storage function and the other a high frequency bypass function. Thus, capacitor 34 may be a 1000 microfarad electrolytic or tantalum type capacitor to provide a voltage storage function. Whereas capacitor 36 may be a 0.01 microfarad ceramic capacitor for shunting high frequency signals to ground. The three terminal voltage regulator 40 is a commercially available 5-voltage regulator having the designation 78L05 available from such manufacturers as NATIONAL SEMICONDUCTOR CORPORATION. The 5-volt regulated output of regulator 40 is coupled to the DC voltage output line 41 for use by the other circuits which together form system 10. The regulated voltage output supplied to line 41 is also filtered by a pair of capacitors 38, 39 coupled in parallel between the output line 41 and the ground reference terminal 22. Capacitor 38 may beta 10 microfarad capacitor for providing voltage storage, while capacitor 39 may be a 0.1 microfarad capacitor providing high frequency bypass from line 41 to the ground reference terminal 22.

Figure 1:
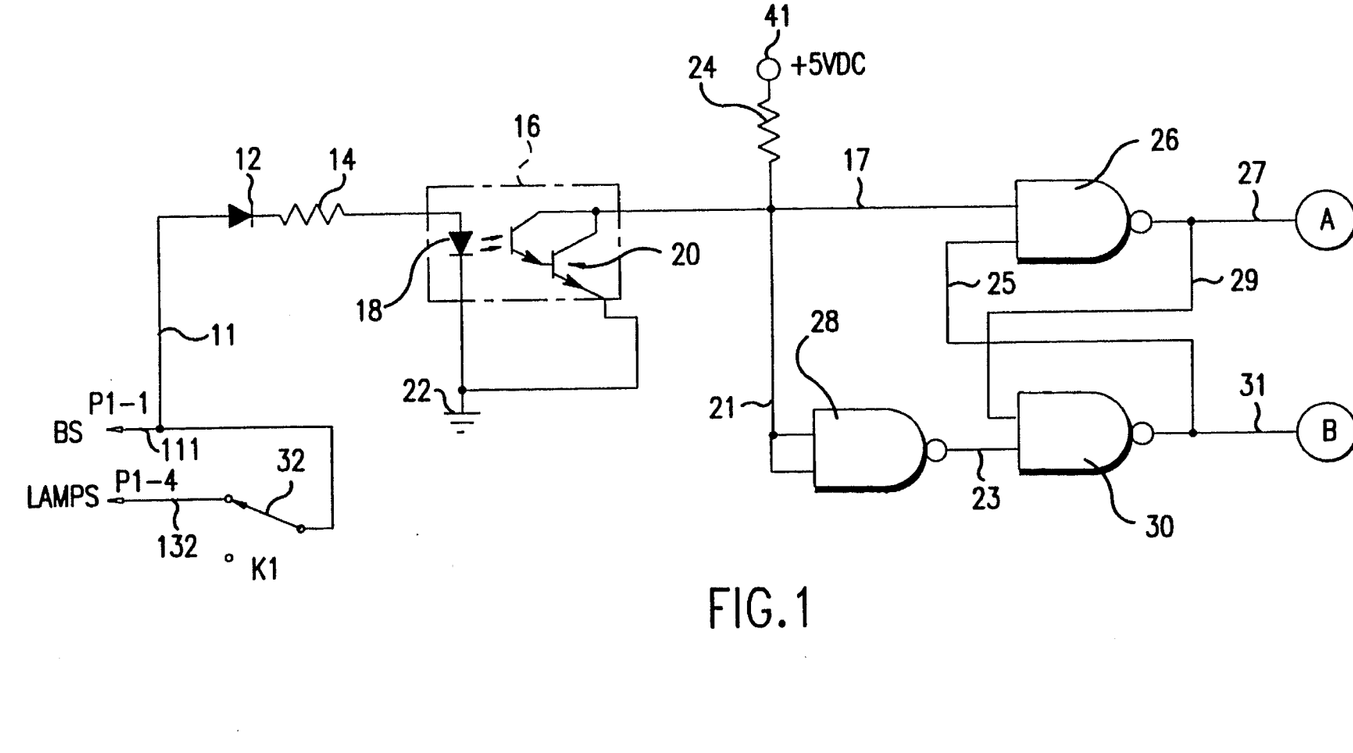
FIG. 1 is a schematic diagram of the brake switch closure detection circuit of the present invention.

Referring now to FIG. 1, there is shown the brake lamp switch input circuit of system 10. As previously described, voltage is supplied to the input line responsive to closure of the brake switch 908, through the line 916a and the connector, P1. The voltage supplied from the brake switch 908 is coupled through a normally closed relay contact 32 to the brake lamp output line 132. This is an important feature of system 10 in providing fail safe operation of the brake lamps. As the brake switch is normally coupled to the brake lamps through a normally closed contact of a relay K1, any failure in the output circuitry of system 10 will leave this connection undisturbed. Even a failure in the relay itself, the most common being welding of contacts and an open coil, would preserve the normally closed connection to maintain the integrity of the brake lamp/switch circuit. A solid-state switching device, on the other hand, may fail "open", which would leave the brake lamps disabled.

The voltage provided by closure of brake switch 908 is coupled to the anode of an isolation diode 12 through the conductor 11. The cathode of diode 12 is coupled to an optical coupler 16 through a current limiting resistor 14, coupled in series therewith. Optical coupler 16 is a commercially available device which may have a manufacturer's designation of MCA231, available from MOTOROLA, INC. Optical coupler 16 has an input defined by a light emitting diode (LED) 18 whose anode is coupled in series relation with the current limiting resistor 14, and whose cathode is coupled to the system ground 22. Thus, whenever the brake switch is operated, a current flows through the diode 12, resistor 14 and light emitting diode 18 of coupler 16. The photon emissions of LED 18 resulting from that current flow are received by a photo Darlington pair 20 of the coupler 16.

The emitter terminal of the photo Darlington pair 20 is coupled to the system ground 22, such that a low impedance path therewith is provided responsive to receipt of photon emissions from the LED 18. The collector or photo Darlington pair 20 is coupled to an output line 17 which is then coupled to the 5-volt regulated supply line 41 through a pull up resistor 24. In this manner, the line 17 is maintained at an approximate 5-volt potential (logic level "1") when the brake switch is open, the Darlington pair 20 being non-conductive. However, when the brake switch is operated, the line 17 is pulled down to substantially ground potential (logic level "0"). The output of optical coupler 16, by way of line 17 is coupled to a flip-flop defined by a pair of cross-coupled gates 26 and 30, which functions as a debounce circuit.

The output on line 17 is supplied to one input of a two input NAND gate 26 and to one input of the other NAND gate 30 through an inverter defined by a NAND gate 28. The output from line 17 is coupled to each of the two inputs of NAND gate 28 through an input connecting line 21, the output 23 thereof being coupled to one input of NAND gate 30. The output 31 of NAND gate 30 is coupled to the second input of NAND gate 26 through the line 25 while the output 27 of NAND gate 26 is coupled to the remaining input of NAND gate 30, as is conventional to form a flip-flop circuit. The respective outputs 27 and 31 of NAND gates 26 and 30 are coupled to the flashing control circuitry shown in FIG. 4.

Figure 3:
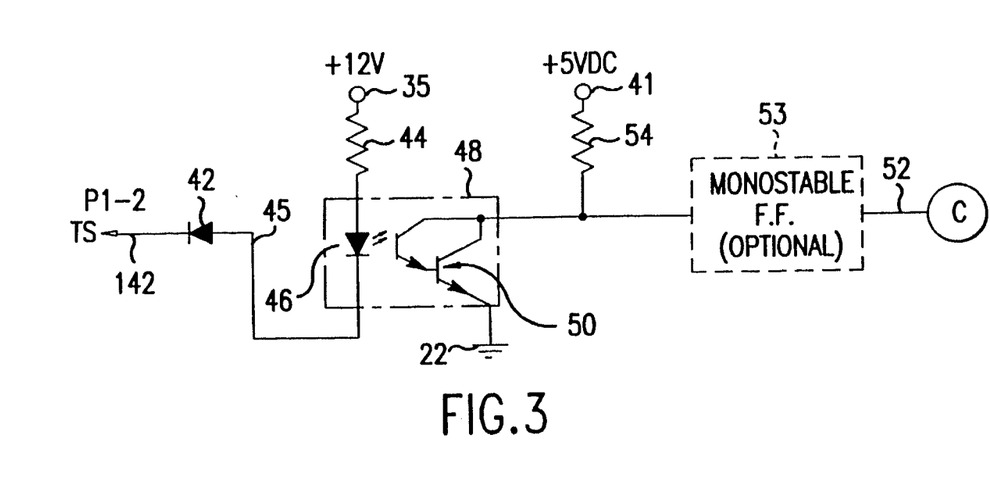
FIG. 3 is a schematic diagram of the turn signal switch closure detection circuit of the present invention.
Figure 4:
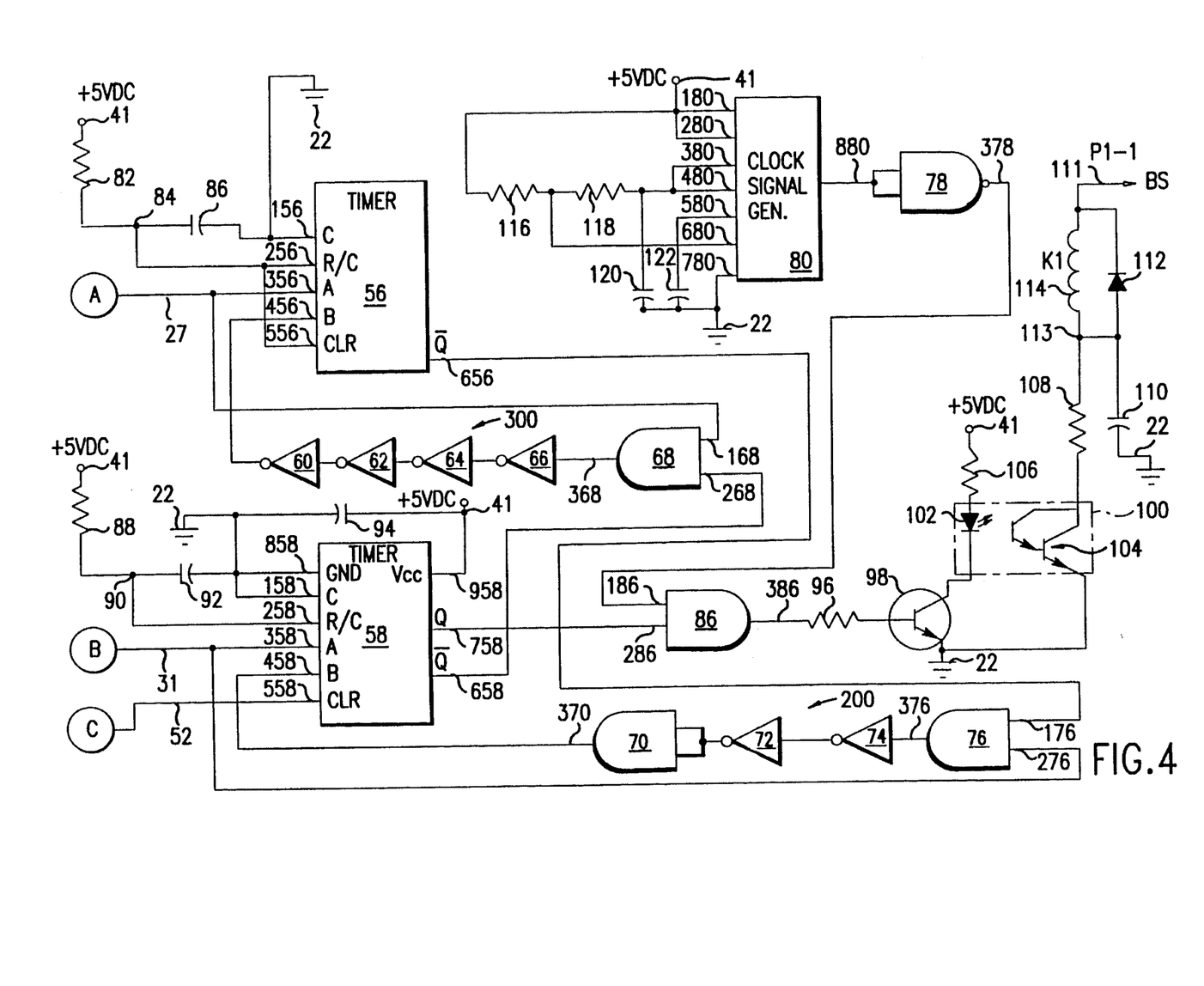
FIG. 4 is a schematic diagram of the timing and switching circuits of the present invention.

Before proceeding to FIG. 4, it will be helpful to first describe the turn signal input circuit, the output of which is also coupled to the control circuitry of FIG. 4. As shown in FIG. 3, the turn signal input line 142 is coupled to the cathode of an isolation diode 42. The anode of diode 42 is coupled to the cathode of the light emitting diode 46 of optical coupler 48 by the conductor 45. The anode LED 46 of coupler 48 is coupled to the 12-volt supply line 35 through a current limiting resistor 44. Referring to FIGS. 3 and 6 in combination, it will be observed that no current will flow through the light emitting diode 46 when neither of the turn signal switches have been operated, such that both are coupled to the brake signal line 916b, as the flasher output line 921 is either at a 12-volt potential, 0 volts or open, depending on the type of turn signal flashing system installed in the vehicle. However, when either the left or right turn signal switch is operated, such provides a current path from the 12-volt supply 35 through current limiting resistor 44, LED 46 and diode 42 and the respective turn signal lamp 912' or 914' to ground (the return side of the vehicle's battery), when the potential of line 921 is not at 12 volts.

Thus, the flasher 920 intermittently provides an output on line 921, the output typically going from a 12-volt potential to an open condition (some vehicle systems may go to 0-volts instead of an open condition). During the open 0-volt condition intervals, current flows through the LED 46, providing a photon emission to the Darlington phototransistor pair 50 of the optical coupler 48. Here again, the optical coupler may be a commercially available device having a manufacturer's designation MCA231. As in the brake switch sensing circuit, the optic coupler output line 52 is coupled to the 5-volt supply line 41 through a pull up resistor 54, and the emitter of the Darlington pair 50 is coupled to the power supply reference terminal 22. Thus, the output line 52 will switch from a logic level "1" to a logical level "0" responsive to the operation of the left or right turn signal switch.

In vehicles where the flasher 920 provides an intermittent output signal only when the turn signal switch is operated then a circuit identical to that which is utilized for sensing the operation of the brake switch may be utilized for sensing the turn signal operation. Such could be implemented utilizing jumpers to select the connections for the LED 46 of optical coupler 48, to configure it as shown in FIG. 3 or like that of LED 18 of coupler 16. In some cases, the flash rate of the vehicle's flasher 920 may have a duty cycle whose "off" time is very short in comparison to the "on" time. As such could interfere with proper functioning of system 10, a monostable flip-flop 53 may be optionally utilized. When used, the collector of the photo Darlington pair 50 is coupled to the input of the flip-flop 53, and the output of the flip-flop is coupled to line 52. A conventional 555 timer circuit may be configured as a monostable flip-flop, with its time constant selected to be at least as long as the "on" time of the flasher 920.

FIG. 4 shows the timing and control circuits of system 10. In overall operation, a relay and driver circuit is provided for periodically interrupting the coupling of the brake lamps with the voltage supplied through the brake switch, thereby providing for a flashing of the brake lamps. A first timer limits the period for such flashing to a predetermined limited amount of time, on the order of 2 to 4 seconds. Once the flashing sequence is initiated, a second timer is enabled when the brake switch is opened, which prevents re-initiation of the flashing sequence for a second predetermined time period. The second predetermined time period may be in the approximating range of 10 to 15 seconds in duration. Lastly, an additional connection to the first timer can be used to inhibit the brake lamp flashing whenever one of the turn signals is operated.

Following the circuit diagram of FIG. 4 from the output back, one end of the coil 114 of relay K1 is coupled to the brake lamp switch input signal line 111, providing 12-volts thereto whenever the brake switch 908 is closed (pressure applied to the vehicle's brake pedal). A current path through the coil 114 is provided through a current limiting resistor 108 and the photo Darlington transistor pair 104 of an optical coupler 100. Relay coil 114 is shunted by a protection diode 112 for dissipating self-induced voltages generated by coil 114 when such is de-energized. Further, a decoupling capacitor 110 is coupled from the node 113 between the relay coil 114 and current limiting resistor 108 and the power supply return 22, for shunting high frequency transients to ground. Optic coupler 100 may be a commercially available device having a manufacturer's designation MCA231. The emitter output of the Darlington pair 104 is coupled to the power supply reference 22, such that a complete current path is provided through the Darlington pair 104 responsive to photon emissions from the LED 102 of that device, thereby causing the relay contact 32 shown in FIG. 1, to open. As will be described in following paragraphs, this opening of relay contact 32 will be intermittent, opened and closed at a predetermined rate, for a predetermined first time period.

The anode of the LED 102 of optical coupler 100 is coupled to the 5-volt supply line 41 through a current limiting resistor 106, the cathode thereof being coupled to the collector of a driving transistor 98. The emitter of the driving transistor 98 is coupled to the power supply reference 22, to thereby provide a current path from the 5-volt supply 41 to the power supply reference 22 responsive to an input signal supplied to the base of transistor 98, as is conventional. Driving transistor 98 may be a commercially available transistor have the product designation 2N2222, available from any of a plurality of semiconductor manufacturers. An intermittent base drive signal is coupled to the base of transistor 98 from the output 386 of AND gate 86 through the current limiting resistor 96. The intermittent base drive signal is the product of a clock signal applied to the AND gate input 186 responsive to an ENABLE signal supplied to the AND gate input 286 from the timer 58 output 758.

Therefore, the flash rate is established by the clock signal supplied to the input 186 of AND gate 86. The clock signal supplied to gate 86 is generated by the clock signal generator 80, whose output 880 is coupled to the inverter 78. Inverter 78 is defined by a NAND gate having each of its two inputs coupled to the clock generator output 880. The output 378 of inverter 78 is coupled to the input 186 of gate 86. In each case wherein a NAND gate is configured as an inverter, such may in fact be replaced by an inverter circuit. As multiple gates are provided in an integrated circuit package, spare gates, those not required to perform a not-AND logic function may be utilized as inverters, as an alternative to adding additional integrated circuit packages in order to provide inverters. In some cases, AND gates are utilized an non-inverting buffers in order to provide a "gate delay" without introducing a change to the logic level of the signal input thereto.

The clock signal generator 80 may be a commercially available integrated circuit having a manufacturer's designation of LM555, available from NATIONAL SEMICONDUCTOR CORPORATION. The clock signal generator 80 has a voltage supply input 180 coupled to the 5-volt supply line 41 and a reset input 280 also coupled thereto, such that the output line 880 provides a continuous square wave signal of predetermined frequency and duty-cycle. The trigger and threshold inputs 380 and 480, respectively, are each coupled to one end of a first timing resistor 118 and a first capacitor 120. The opposing end of resistor 118 is coupled to the discharge terminal 680 of clock signal generator 80 and one end of a second timing resistor 116. The opposing end of resistor 116 is coupled to the 5-volt supply line 41. As is conventional for the type of timer circuit utilized for clock signal generator 80, a second capacitor 122 is coupled between the control terminal 580 and the power supply reference 22. Capacitor 122 has a value approximating 0.01 microfarads. The frequency of the square wave output signal of the clock signal generator circuit 80 is a function of the resistance values of both resistors 116 and 118, and the capacitance value of capacitor 120, while the duty cycle is a function of the resistance values of each of resistors 116 and 118. In one working embodiment, resistor 116 has a value of 20 kilohms, resistor 118 has a value of 15 kilohms and capacitor 120 has a value of 10 microfarads, thereby providing an output signal of approximately 3 Hz with a duty cycle approximately 0.3.

Responsive to the clock signal output by the clock signal generator 80 and buffered by the inverter connected NAND gate 78, the relay contact 32 will be opened at the rate of three times per second, thereby flashing the brake lights at that rate. The period of time for which the brake lamps will flash at that rate is controlled by the ENABLE signal coupled to input 286 of AND gate 86 supplied from the timer circuit 58. The output from the output terminal 758 of timer 58 is responsive to two inputs, an output from a second timer circuit 56, supplied to the input 458 through the delay circuit 200 and an input from the brake switch debounce circuit output line 31, coupled to the input terminal 358. Timer circuit 58 may be one half of a commercially available dual monostable multi-vibrator having the designation 74HC123, available from any of a large number of semiconductor manufacturers. The other half of the integrated circuit, is utilized to implement the second timer 56, as will be described in following paragraphs.

The power supply input terminal 958 is coupled to the 5-volt supply line 41, and the power supply reference terminal 22 is coupled to the ground connection terminal 858 of the integrated circuit which forms timers 56 and 58. As is conventional, a decoupling capacitor 94 is coupled between the power supply and reference terminals of the integrated circuit. Although not shown in the drawings, each of the individual integrated circuit packages are similarly coupled to the power supply 5-volt supply line 141 and the ground reference terminal 22, with a respective coupling capacitor connected between such terminals in close proximity to the respective integrated circuit package.

The time period for which the output 758 is a logic "1" is determined by the RC time constant defined by the value of resistor 88 and capacitor 92 which are coupled in series relation between the 5-volt line terminal 41 and the capacitor terminal 158 of timer 58. The node 90 between resistor 88 and capacitor 92 is coupled to the input terminal 258 of timer 58. Resistor 88 may have a value of 10 kilohms and capacitor 92 may have a value of 220 nanofarads such that timer 58 will enable AND gate 86 for a two second period, allowing the brake lights to flash six times before being maintained continuously illuminated while the brake switch is thereafter maintained in a closed state.

Timer 56, the other half of the integrated circuit package having the designation 74HC123, has an R/C time constant defined by the resistor 82 having one end coupled to the 5-volt power supply line 41, and a capacitor 86 coupled in series relation with resistor 82. The node 84 disposed between resistor 82 and capacitor 86 is coupled to the R/C input terminal 256 of timer 56, while the opposing end of capacitor 86 is coupled to the input terminal 156 of timer 56. Resistor 82 may be a 51 kilohm resistor and capacitor 86 may be a 220 microfarad capacitor, to provide an approximate ten second timing period for timer 56. The input 356 of timer 56 is coupled to the brake switch debounce circuit line 27, while the second input 456 is coupled to the outputs 658 of timer 58 through the delay circuit 300.

Output 656 of timer 56 is normally at a logic "1" level, and is coupled to the input 176 of AND gate 76 of delay circuit 200. Thus, when the brake switch is first activated by the user's application of pressure to the brake pedal, a change in state of the debounce circuit output line 31 from a logic high to a logic low is coupled to the input 358 of timer 58 and input 276 of gate 76. Since both inputs to gate 76 are no longer high, a logic low is provided at output 376 of gate 76 for transmission through the inverter 74 and inverter 72 to provide a logic low to both inputs of AND gate 70, which likewise provides a logic low at its output 370 for coupling to input 458 of timer 58. The delay circuit 200 thereby provides a four gate delay for preventing a race condition which could occur between the two timers 56 and 58 and between transitions at each of the inputs 358 and 458. AND gate 70 is utilized in place of an inverter to provide the appropriate delay without producing an inversion of the logic level of the signal provided thereto.

Prior to the application of pressure to the vehicle's brake, the brake switch is open and the output of debounce circuit line 27 is at a logic "0". This logic low is provided to the input 356 of timer 56 and the input 168 of AND gate 68. With the brake switch open, the output 658 of timer 58 is at a logic high, and such is coupled to input 268 of AND gate 68. Therefore, the output 368 of gate 68 is at a logic low, which is coupled to the input 456 through four inverters 66, 64, 62, and 60 to provide a logic level low to the input 456 of timer 56. When the brakes are applied and brake switch 908 is closed, the logic state of debounce circuit output lines 27 and 31 change. The buffering of the output 656 through a four gate delay and the output 658 through a five gate delay, avoids potential race conditions and insures proper triggering of the timers.

Timer 58 is triggered by closure of the vehicle's brake switch, the transition of line 31 from high to low. Responsive to that transition, output 758 goes to a logic level high for the time period determined by resistor 88 and capacitor 92, then returns to a low state. Thus, timer 58 provides the ENABLE .pulse for approximately two seconds to AND gate 86. Output 658 likewise changes from a high to a low during that time period. When the vehicle's brake pedal is released, the brake switch opens and the logic state of line 27 transitions back to a logic low. Timer 56 is triggered by this change in state of debounce circuit line 27 from a logic high to a low. The triggering of timer 56 provides a logic low output at terminal 656 for the predetermined time period established by resistor 82 and capacitor 86, a period of approximately ten seconds. As applied through the delay circuit 200 to input 458, this timed logic low state inhibits any subsequent re-triggering of timer 58 during that ten second interval, thereby preventing re-initiation of the two second flash period which would otherwise occur when the user "taps" on the brake. Thus, system 10 does not permit more that six flashes of the brake lights during at least a ten second interval, irrespective of when the brake switch is closed, reopened and closed again during that interval.

In those vehicles where one lamp is utilized as both a turn signal and brake indicator, the closure of either the left or right turn signal switch provides a change in state on the output line 52 of the turn signal switch detection circuit (FIG. 3), as applied to the input 558 of timer 58. Input 558 changes from a logic level high to a logic level low when the turn signals are operated, such change in state forces the output 758 of timer 58 to a logic low level. The logic low level applied to input 286 of gate 86 thereby inhibiting the clock pulses applied to input 186 from appearing at the output 386 of gate 86, irrespective of the condition of the brake switch. Thus, any flashing of the brake lights is thereby inhibited, as the driver transistor 98 is maintained non-conducting, as is the photo Darlington pair 104 of optical coupler 100.

It can therefore be seen that system 10 enhances the perception by other drivers of a vehicle's brake lights, by providing an attention getting flashing sequence when the brakes are first applied. This sequence is limited to a time interval of predetermined duration. However, in order to avoid annoyance, distraction and confusion, the brief flashing period is prevented from being extended by discontinuance and then re-application of the brakes during the duration of a second time interval. The flashing is further inhibited when the turn signals are utilized by the vehicle, where such vehicle utilizes the same lamp for both brake and turn signal indications. A fail safe operation of the brake lights is maintained by providing a current path from the brake switch to the brake lights through a normally closed contact of a relay, whereby the flashing sequence is provided by intermittently opening that relay contact. Thus, any failure in the system 10 will simply fail to operate the relay, heaving the normally closed contacts undisturbed. While solid-state switching devices are highly reliable, they are subject to failure in an "open" condition, which if utilized to interrupt the brake light circuit, could leave such totally inoperative.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is being claimed is:

1. A system for enhancing perception of the illumination of a plurality brake lamps of a motor vehicle, the motor vehicle having a brake light switch for coupling an electrical power source to the plurality of brake lamps responsive to an actuation of the vehicle's brake system, comprising:

means for establishing a substantially constant first predetermined time period and periodically interrupting the coupling of the electrical power source to the plurality of brake lamps for said first predetermined time period responsive to a closure of the brake light switch to flash the plurality of brake lamps at a predetermined flash rate, said interrupting means being electrically coupled to both the brake light switch and the plurality of brake lamps; and, first inhibiting means coupled to said interrupting means and the brake light switch for establishing a second predetermined time period and inhibiting said flashing of the plurality of brake lamps for said second predetermined time period responsive to an opening of the brake light switch, said second predetermined time period being of longer duration than said first time period, said flashing being inhibited during said second predetermined time period irrespective of subsequent closure of the brake light switch.

2. The system of as recited in claim 1 where said interruption means includes:

a. switching means having an output coupled to the brake lamps for periodically interrupting a current flow from the electrical power source to the brake lamps responsive to both a control signal coupled to a first input of said switching means and a periodic clock signal coupled to a second input of said switching means;

b. clock generator means having an output coupled to said second input of said switching means for continuously providing said periodic clock signal at a predetermined frequency, said predetermined frequency defining said flash rate of the plurality of brake lamps; and, c. timing means having an input coupled to the brake light switch and an output coupled to said first input of said switching means for establishing said first predetermined time period and generating said control signal coincident therewith responsive to closing of the brake light switch.

3. The system of as recited in claim 1 further comprising second inhibiting means coupled to a vehicle's turn signal switch and said interrupting means for inhibiting said periodic interruption of the coupling of the electrical power source to the plurality of brake lamps responsive to an actuation of the turn signal switch.

4. The system of as recited in claim 3 where said interruption means includes:

a. switching means having an output coupled to the brake lamps for periodically interrupting a current flow from the electrical power source to the brake lamps responsive to both a control signal coupled to a first input of said switching means and a periodic clock signal coupled to a second input of said switching means;

b. clock generator means having an output coupled to said second input of said switching means for continuously providing said periodic clock signal at a predetermined frequency, said predetermined frequency defining said flash rate of the plurality of brake lamps; and, c. first timing means having a first input coupled to the brake light switch and a first output coupled to said first input of said switching means for establishing said first predetermined time period and generating said control signal coincident therewith and responsive to the closure of the brake light switch.

5. The system of as recited in claim 4 where said first inhibiting means includes second timing means for establishing said second predetermined time period and providing an inhibit signal to said first timing means coincident therewith and responsive to the opening of the brake light switch, said second timing means having an output coupled to a second input of said first timing means, said first timing means inhibiting said generation of said control signal responsive to receipt of said inhibit signal.

6. The system of as recited in claim 5 where said first inhibiting means includes first delay means having an input coupled to said output of said second timing means and an output coupled to said second input of said first timing means for delaying receipt of said inhibit signal by said first timing means by a first predetermined delay time period.

7. The system of as recited in claim 6 where said first inhibiting means includes second delay means having an input coupled to said second output of said first timing means and an output coupled to said second input of said second timing means for delaying receipt of a signal output from said first timing means.

8. The system of as recited in claim 6 where said second inhibiting means includes means for coupling a signal from a vehicle's turn signal switch to a third input of said first timing means for disabling said generation of said control signal.

9. The system of as recited in claim 4 where said switching means includes:
   a. a relay having a pair of normally closed contacts respectively coupled between an output of the brake light switch and the plurality of brake lamps and a coil having a pair of terminals, said coil having a first of said pair of terminals coupled to said output of the brake light switch;
   b. driver means having an output coupled to a second of said pair of terminals of said coil for completing a circuit through said coil responsive to a driver control signal; and,
   c. gate means having an output coupled to an input of said driver means for intermittently generating said driver control signal during said first predetermined time period, said gate means having a first input coupled to said first output of said first timing means and a second input coupled to said output of said clock generator means.

10. The system of as recited in claim 9 where said driver means includes an optical coupler for electrically isolating said relay from said gate means.

11. The system of as recited in claim 2 where said timing means includes:
   a first timing circuit having a first input coupled to an output of the brake light switch for sensing a closure of the brake light switch and a first output coupled to said first input of said switching means; and,
   a second timing circuit having a first input coupled to said output of the brake light switch for sensing an opening of the brake light switch, a second input coupled to a second output of said first timing means for sensing a logic state thereof, and a first output coupled to a second input of said first timing means for inhibiting said generation of said control signal.

12. The system of as recited bin claim 11 where said timing means includes first delay means having an input coupled to said output of said second timing circuit and an output coupled to said second input of said first timing circuit.

13. The system of as recited in claim 12 where said timing means includes second delay means having an input coupled to said second output of said first timing circuit and an output coupled to said second input of said second timing circuit.

14. The system of as recited in claim 11 where said switching means includes
   a. a relay having a pair of normally closed contacts respectively coupled between an output of the brake light switch and the plurality of brake lamps and a coil having a pair of terminals, said coil having a first of said pair of terminals coupled to said output of the brake light switch;
   b. driver means having an output coupled to a second of said pair of terminals of said coil for completing a circuit through said coil responsive to a driver control signal; and,
   c. gate means having an output coupled to an input of said driver means for intermittently generating said driver control signal during said first predetermined time period, said gate means having a first input coupled to said output of said timing means and a second input coupled to said output of said clock generator means.

15. The system of as recited in claim 14 where said driver means includes an optical coupler for electrically isolating said relay from said gate means.

16. A system for enhancing perception of a vehicle's brake lights, comprising:
   a. a power source;
   b. a brake light switch coupled to said power source;
   c. a plurality of brake lamps disposed within the vehicle's brake lights, said plurality of brake lamps being coupled to both said power source and said brake light switch for illumination thereof responsive to a voltage signal from said brake light switch generated by a closure of said brake light switch;
   d. switching means coupled between said brake light switch and said plurality of brake lamps for periodically interrupting said voltage signal from said brake light switch responsive to a control signal to flash said plurality of brake lamps;
   e. control means having a first input coupled to said brake light switch and an output coupled to said switching means for establishing a predetermined first time period and intermittently generating said control signal during said predetermined first time period; and,
   f. first inhibiting means having an input coupled to said brake light switch and an output coupled to a second input of said control means for establishing a predetermined second time period and inhibiting said generation of said control signal during said predetermined second time period, said second time period being initiated responsive to a termination of said voltage signal from said brake light switch, whereby said plurality of brake lamps are illuminated continuously responsive to a subsequent closure of said brake light switch during said second time period.

17. The system of as recited in claim 16 further comprising second inhibiting means having an input coupled to a vehicle's turn signal switch and an output coupled to a third input of said control means for inhibiting said generation of said control signal responsive to an actuation of the turn signal switch.

18. The system as recited in claim 16 where said control means includes:
   a. gate means having an output coupled to said switching means for coupling said control signal thereto;
   b. clock generator means having an output coupled to a first input of said gate means for continuously providing said a periodic clock signal at a predetermined frequency thereto, said predetermined frequency defining a flash rate of said plurality of brake lights; and, c. first timing means having a first input coupled to the brake light switch and a first output coupled to a second input of said gate means for establishing said first predetermined time period and generating said control signal coincident therewith responsive to said closure of said brake light switch.

19. The system as recited in claim 18 where said first inhibiting means includes second timing means for establishing said predetermined second time period and providing an inhibit signal to said first timing means coincident therewith and responsive to an opening of said brake light switch, said second timing means having an output coupled to a second input of said first timing means, said first timing means inhibiting said generation of said control signal responsive to receipt of said inhibit signal.

20. The system of as recited in claim 16 where said switching means includes a relay having a pair of normally closed contacts respectively coupled between an output of the brake light switch and said plurality of brake lamps.

* * * * *